Patented May 16, 1933

1,909,508

UNITED STATES PATENT OFFICE

LOUIS L. SCHICK, OF CHICAGO, ILLINOIS, ASSIGNOR OF ONE-THIRD TO WALTER H. FLOOD, OF CHICAGO, ILLINOIS

PRESERVATION OF HAMBURGER STEAK

No Drawing.   Application filed January 6, 1932. Serial No. 585,164.

My invention relates to the art of treating meat for hamburger use whereby to retain its condition and color, and my main object is to provide a process whereby the original color of the meat may be maintained for an indefinite period while it is under refrigeration.

A further object of the novel process is to bind the meat against disintegration when handled and to impart to the same a smooth texture.

Various methods have been employed and tried for preserving and binding hamburger steak, in order that it may retain its original color and its body. Thus, sodium sulphite, a white granular substance, has been used for treating the meat, and while it acts as a preservative of color, it has been condemned as injurious to the health and therefore prohibited in most localities. Also, the use of this chemical tends to draw or shrink the hamburger steak when fried or cooked. Meat has also been treated with ordinary salt for the purpose of keeping it looking fresh, but experience has shown that the meat soon assumes a grayish color and becomes unsaleable because of this appearance. Also, a cereal solution has been tried for the purpose of binding the hamburger steak, but it nevertheless lost its original color before long and therefore its sale value.

In carrying out the novel process, I use the following ingredients for a given quantity of the product:—

1 gallon freshly churned buttermilk
12 ounces free running table salt
100 pounds meat In applying the process, the meat is cut into chunks of smaller or larger size as may be desired and put into a receptacle. The salt is then dissolved into the buttermilk to make a brine and the latter is poured over the meat. The ingredients are then thoroughly mixed until the brine becomes fully absorbed into the meat. It may then be removed and placed into the refrigerator. Finally, quantities may be removed as needed and ground to produce hamburger steak.

The resulting product will have a smooth, velvety touch, and will hold together rather than loosen or crumble, since the brine acts as a binder. The treatment serves to preserve the meat in its original color indefinitely while under refrigeration. Further, the hamburger steak will retain its original size or form when fried or cooked. Further, the brine adds nutritive value to the meat, helps digestion, and promotes alimentary function. Finally, the process entails but a small extra expense, which is well compensated by the attractive and wholesome condition of the meat and by its favorable effect on the trade.

I claim:—

1. The process of preserving raw hamburger steak meat while under refrigeration, comprising cutting the meat in pieces and impregnating the pieces with a solution of salt in buttermilk.

2. The process of preserving and preparing hamburger steak meat for market, comprising cutting the meat into coarse pieces, impregnating the pieces with a solution of sodium chloride in buttermilk by thorough mixing, storing said impregnated pieces under refrigeration, and grinding the pieces to a comparatively fine degree.

3. A food product to be kept under refrigeration, comprising coarsely cut pieces of hamburger steak meat impregnated with a solution of sodium chloride in buttermilk.

In testimony whereof I affix my signature.

LOUIS L. SCHICK.